United States Patent [19]
Meier et al.

[11] 3,940,663
[45] Feb. 24, 1976

[54] DRIVE CIRCUIT FOR A MAIN CONTACTOR

[75] Inventors: Werner Meier, Bubenreuth; Rudolf Schmidt; Martin Kraft, both of Erlangen, all of Germany

[73] Assignee: Siemens Aktiengesellschaft, Munich, Germany

[22] Filed: Jan. 30, 1975

[21] Appl. No.: 545,593

[30] Foreign Application Priority Data
Feb. 7, 1974   Germany............................ 2405908

[52] U.S. Cl. ...................... 317/23; 317/31; 317/49
[51] Int. Cl.² .......................................... H02H 3/24
[58] Field of Search ............ 317/23, 22, 36 TD, 25, 317/31, 49; 340/163

[56] References Cited
UNITED STATES PATENTS

| | | | |
|---|---|---|---|
| 3,100,854 | 8/1963 | Riebs.................................. | 317/22 |
| 3,317,791 | 5/1967 | Price et al............................. | 317/22 |
| 3,440,491 | 4/1969 | Tenenbaum et al.................. | 317/22 |
| 3,471,749 | 10/1969 | Harris.................................. | 317/23 |
| 3,689,887 | 9/1972 | Lafalce et al...................... | 317/22 X |
| 3,757,302 | 9/1973 | Pollitt ................................. | 317/22 X |
| 3,878,436 | 4/1975 | Bogel.................................. | 317/22 |

*Primary Examiner*—J. D. Miller
*Assistant Examiner*—Patrick R. Salce
*Attorney, Agent, or Firm*—Kenyon & Kenyon Reilly Carr & Chapin

[57] ABSTRACT

A drive circuit for a main contactor which opens the contactor when a voltage dip occurs and if the voltage dip is of short duration closes the contactor again but blocks reclosing if the voltage dip persists. The circuit includes means to form an undervoltage pulse which has a duration which is equal to the length of time an undervoltage is present or a predetermined maximum time which ever is shorter. As long as the undervoltage pulse is shorter than the predetermined maximum the contactor is again closed but should the undervoltage persists beyond the predetermined maximum pulse length the drive circuit is allowed to become permanently disabled until further action is taken.

5 Claims, 2 Drawing Figures

DRIVE CIRCUIT FOR A MAIN CONTACTOR

BACKGROUND OF THE INVENTION

This invention relates to automatic control circuits for contactors in general and more particularly to an improved drive circuit for a main contactor.

Drive circuits for main contactors and the like which are used as individual control means between a central command transmitter and the individual control elements of a control system are known. Typically these may be between the control station in the control room for the automatic control of a functional group or a data processing system. The drive circuits are used to couple the commands of the command transmitter logically to each other and to protection commands and monitoring signals to form positioning commands for the control elements assigned to them.

One known drive circuit for a power contactor not only amplifies the ON and OFF commands of a higher order central command transmitter for transmission to auxiliary or coupling contactors but also contains a monitoring unit which monitors return signals from the main contactor to determine whether or not it has reached the position ordered after an adjustable travel period. That is to say to determine whether the main contactor has opened or closed as commanded. Such a circuit is disclosed in Siemens Zeitschrift 47, 1973, pages 315 to 320. If the contactor does not reach the ordered position or leaves that position without an appropriate command, an error signal is provided to the central command transmitter which then intervenes with appropriate measures.

When using this type of a drive circuit for a contactor having a latching feature, a lowering of the control voltage can lead to an uncontrolled opening of the contactor. Since the return signals of the opened contactor will then no longer agree with the stored positioning command an error is signaled which causes the central command transmitter to intervene. On the basis of the signaled trouble, the central command transmitter can shut off either the entire installation completely or an extensive portion thereof.

However, such a protective disconnection of the entire installation or an extensive part thereof is desirable only if serious trouble actually occurs. Often voltage dips of short duration will occur and then disappear again all by themselves. In such cases a protective disconnection is undesirable. Thus, it can be seen that there is a need for an improved circuit of this nature for controlling a main contactor which will open the contactor in a defined manner should a voltage dip occur and if the voltage dip disappears within a specified time span will reclose the contactor automatically. However in the case of a voltage dip which persists closing action must be blocked.

SUMMARY OF THE INVENTION

The present invention provides a drive circuit for solving this problem. This drive circuits includes the following features:

a. An undervoltage monitor monitoring the control voltage for the main contactor and furnishing a protective command to open the main contactor when the voltage falls below a specified limit;

b. A circuit arrangement for the formation of an undervoltage pulse which is derived from the protection command and which begins upon the occurrence of a protection command and ends either upon the disappearance of that protection command or after a predetermined time period which ever comes sooner;

c. Gates for disabling the device from feeding back end position error signals to the central command transmitter in response to the undervoltage pulse.

With this arrangement and upon occurence of a voltage dip, the undervoltage monitor transmits a protection command to open the contactor in a defined manner to prevent contacts from chattering or fusing. The duration of the undervoltage pulse is obtained from the protection command corresponds to the protection command but is limited to a maximum time span. The undervoltage pulse disables an end position error monitor and prevents the command storage unit from changing. If the protection command ends prior to the predetermined maximum time span for the undervoltage pulse the command storage unit then closes the contactor again since its stored content has not changed. However if the undervoltage pulse exceeds the predetermined maximum duration the contactor remains open and an end position error signal appears and is transmitted.

In accordance with one embodiment of the present invention a simple circuit for the formation of the undervoltage pulse comprises a delay means which is energized by the protection command and which has a response delay corresponding to the predetermined maximum duration of the undervoltage pulse along with gate means which combine the protection command and the output signal of the delay member.

A particularly advantageous embodiment of the present invention which insures that the contactor can be reclosed only if it was in the ON position prior to the occurence of the control voltage dip is disclosed. This is accomplished through the use of disabling gates used in the formation of the end position error signals which are disabled by the priority signal of a priority circuit link for the return voltage of the undervoltage pulse. The priority circuit includes an OR gate for ORING the return signal and the priority signal along with a succeeding AND gate coupling the output signal of the OR gate and the undervoltage pulse as the priority signal. If the contactor was opened or had inadvertently opened prior to the appearance of the undervoltage pulse the priority circuit insures that the contactor remains opened even when the control voltage regains its nominal value.

DETAILED DESCRIPTION OF THE PREFERRED EMBODIMENT

Figure 1:
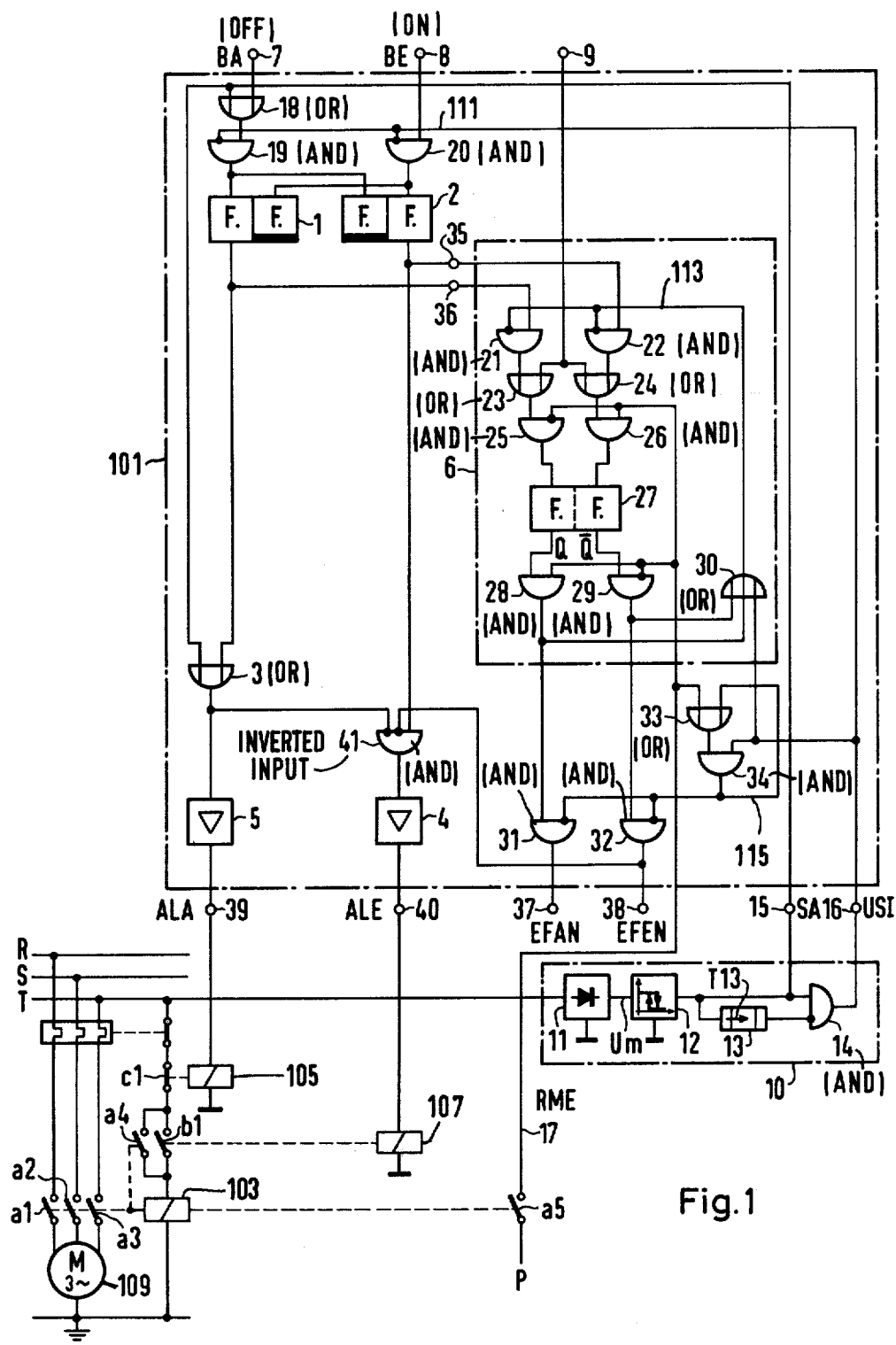
FIG. 1 is a circuit-logic diagram of an embodiment of the present invention.

Shown on FIG. 1 is a drive circuit 101 cntrolling the coil 103 of a main contactor having contacts $a1$, $a2$, $a3$, $a4$ and $a5$. The drive circuit 101 includes storage units 1 and 2 preferably flip flops, which store control commands (an OFF command) and BE (an ON command). The ON and OFF commands are applied respectively to terminals 7 and 8 by a central command transmitter which is not illustrated. The commands are applied through gates 18, 19 and 20 to be described more fully below. The flip flops 1 and 2 are illustrated as a divided block one side of which contains a darkened portion.

The output line from the side of the flip flop which is not darkened represents a logical 1 output when the flip flop is set. Thus, both flip flops 1 and 2 are shown as having outputs from their set side. the output of flip flop 1 is coupled through an OR gate 3 and an amplifier 5 to the coil 105 of an auxiliary contactor having a contact c1. The output of flip flop 2 is coupled through an AND gate 41 and an amplifier 4 to the coil 107 of a contactor having a contact b1.

In the convention shown on the drawing OR gates have their inputs drawn all the way through and AND gates have their inputs terminating at the input edge. A dot at the input of an AND gate indicates an inverted input as indicated in connection with AND gate 41. Neglecting for the moment the additional inputs to gates 3 and 41, it will be seen that an OFF command BA at terminal 7 which sets the flip flop 1 will result in an output through OR gate 3 and amplifier 5 to energize the contactor coil 105 to open the contact c1. Similarly a command at terminal 8 setting flip flop 2 will result, through gate 41 and amplifier 4, in the energization of the coil 107 to close the contact b1. Assuming the system is in the position shown, an ON command BE at terminal 8 setting flip flop 2 will result in a command ALE at terminal 40 which will energize the coil 107 to close the contact b1. In the illustrated embodiment the contactor is controlling a three phase motor 109 provided with power from phases R,S and T through the contacts a1, a2, and a3 respectively. When the coil 107 is energized contact b1 closes coupling the line T to the coil 103 causing all the contacts associated therewith to close. Included is the contact a4 which will then provide a latching function to insure that power continues to be supplied to the coil 103. Also closed will be a signalling contact a5 which provides on a line 17 a feedback or monitoring signal indicating the state of the contacts. The input to the contact a5 labelled P will be a voltage representing a logical 1. The opening or turning off of the contactor is accomplished by an output from flip flop 1 resulting in an OFF command ALA at terminal 39 energizing the coil 105 to open the contact c1 and and break the circuit energizing the coil 103.

Assuming that the signal on line 111 is a logical 0, a command at the input 7 will be provided through OR gate 18 and AND gate 19 to set the flip flop storage 1. That is to say the logical 0 on line 111 will apear as a logical 1 at the inverted input and, when a 1 from OR gate 18 appears, two 1's will be present and AND gate 19 will output a 1 to set flip flop 1. Similarly a 0 on line 111 will enable AND gate so that when a 1 appears at terminal 8 flip flop 2 will be set. The respective outputs of these two flip flops appear on terminals 36 and 35 which are the inputs to a position error monitor circuit 6. The position error monitor 6 includes a desired state storage unit 27 which will also preferably be a flip flop. Its set or Q output will be a 1 when an OFF position is commanded and its reset or $\overline{Q}$ output a 1 when an ON command is desired. An OFF command at terminal 36 will be provided through gate 21 gate 23 and gate 25 to set flip flop 27. Similarly an ON command at input terminal 35 will be provided through gates 22, 24 and 26 to reset flip flop 27. Gates 22 and 21 are AND gates with one inverted terminal. Thus, these gates will be enabled as long as line 113 has a 0 logic level thereon. Such will be the case as long as there is no output from AND gate 28 or 29 and no output signal USI on terminal 16. The generation of this latter signal will be described in more detail below. Presuming that none of these inputs are present at OR gate 30, OR gate will have a 0 output and signals appearing at terminal 35 and 36 will pass through the AND gate 22 and OR gates 23 and 24. AND gate 25 has as its second input the output signal RME on line 17. Only if the main contactor has opened in response to the OFF command provided from flip flop 1 and the contact a5 is opened will line 17 be at a 0 and this inverted input as a 1. Only under these conditions will the flip flop 27 be set. Similarly only if the contactor has responded to an ON command and the signal RME on line 17 is at a logical 1 will the AND gate 26 be enabled to permit the flip flop 27 to be reset. The Q and $\overline{Q}$ outputs of the flip flop 27 are ANDed in AND gates 28 and 29 with the signal RME and its inverse. AND gate 29 will have an output only if both its input are a 1. This will occur when the Q output of flip flop 27 is a 1 indicating that the contactors should be off and the signal RME on line 17 is a 1 indicating that the contactor is closed. This is clearly an error situation. Similarly AND gate 29 will have an output only if the $\overline{Q}$ output of flip flop 27 is a 1 indicating a desired ON condition and the signal RME on line 17 is a zero indicating an OFF or open position, again an error. These respective error signals designated EFAN and EFEN appear at terminals 37 and 38 after being coupled through AND gate 31 and 32 which have, as second, disabling inputs, inverted inputs from a priority circuit 115 to be explained in detail below. The signals EFAN and EFEN are provided back to the central control to indicate an end position error. The end position error signal EFAN indicates that the contact is suppose to be opened but has left that position. Similarly the signal EFEN indicates that the contact is suppose to be closed but has left that position. These signals which are initially generated in gates 28 and 29 are inputs to OR gate 30. Thus, should either of these signals appear, OR gate 30 will have a 1 output signal on line 113 and gates 21 and 22 will be disabled to prevent a change in the storage state of the flip flop 27 until further action is taken. Such further action can be taken by means of a command on terminal 9 from the central control which when provided through OR gate 23 and 24 will result in the flip flop 27 being set or reset to a state corresponding to the contactor position.

Figure 2:
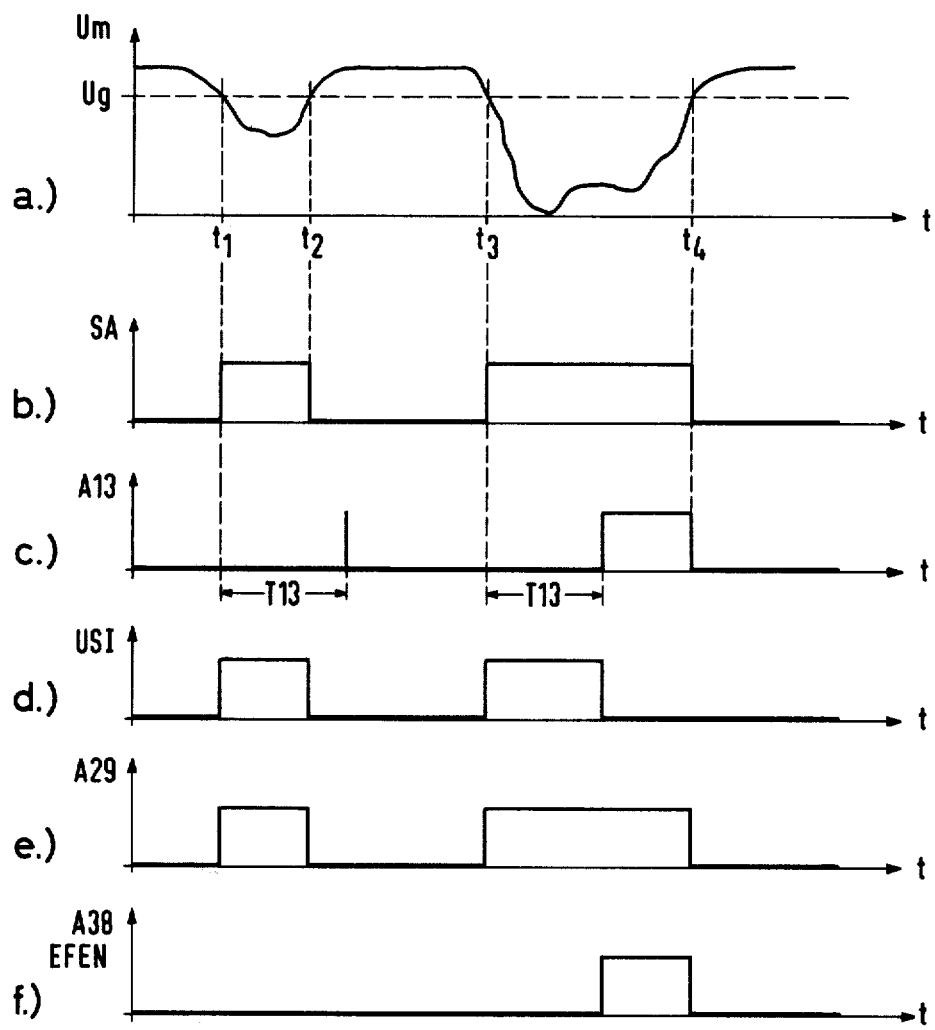
FIG. 2 is a wave form diagram helpful in understanding the operation of the circuit of FIG. 1.

As noted above, the signals EFAN and EFEN, are provided to the central command transmitter which can then initiate an appropriate action to shut down the system. However, in accordance with the present invention it is desired to provide these signals back to the central command transmitter only when necessary and not in the case of brief, temporary voltage dips. To insure that such occurs a monitoring unit 10 along the gates 31 and 32 are provided. The monitoring unit or monitoring circuit 10 includes a transformer rectifier stage 11 followed by a comparator 12. In the illustrated embodiment the transformer rectifier 11 is coupled to the phase T which is the control voltage for the main contactor. However, if desired, a three phase monitoring device may be provided instead. Such has the advantage that a dip in any of the phases will be detected. The transformer and rectifier unit 11 rectifies and reduces in voltage the phase voltage T to develop a signal $U_m$ shown in waveform $a$ of FIG. 2. This voltage is provided as an input to a comparator 12 which has its reference voltage a voltage $U_g$ shown by the dotted line on FIG. 2 waveform $a$. Comparator 12 is arranged such that as long as the voltage $U_m$ is above the voltage $U_g$ it will provide a logical 0 output but when the voltage $U_m$ drops below the voltage $U_g$ it will provide a logical 1 output. This output is provided to an AND gate 14 and to a time delay circuit 13 having a time delay T13. As indicated by waveform b of FIG. 2, when the voltage drops below the predetermined level at time $t_1$ the output designated SA of the comparator 12 goes from a logic 0 to a logic 1. This is provided at an input terminal 15 of the circuit 101 and is coupled both to the OR gate 18 and to the OR gate 3. Through the OR gate 3 and the amplifier 5 it will activate the contact c1 to open the main contactor. A 1 signal will also appear at the input to AND gate 19. However, at this point AND gate 19 will be disabled by a logical 1 signal on line 111. This signal on line 111 designated USI is developed in AND gate 14. AND gate 14 will have a logical 1 input from the comparator 12 and will also have a logical 0 input from the delay means 13, the delay period T13 not having yet been traveled. This is illustrated by FIG. 2 waveform D. It can be seen that in accordance with waveform B the signal SA from the comparator 12 is at a logical 1 and the signal A13 from the delay means 13 is at a logical 0 resulting in the signal USI being at a logical 1. Thus, the flip flop 1 will not be set in response to the output from gate 18. The signal USI at terminal 16 is also provided as an input to the OR gate 30 disabling the gates 21 and 22 to prevent any change in the setting of the storage flip flop 27. It should be pointed out that the positive action of opening the main contactor is necessary even for a small voltage dip to prevent chattering and fusing of the contact. The signal USI is also provided as one input to AND gate 34 in the priority circuit 115. AND gate 34 has as its second input the output of OR gate 33 which has as its inputs the signal RME and the output of AND gate 34. This circuit insures that after a small voltage dip the contacts will be reclosed only if they were initially closed. If the contacts were initially closed, a logical 1 from the line 17 will have been coupled through OR gate 33 to one input of AND gate 34. As soon as the 1 signal appears on at the input 16, i.e., signal USI, AND gate 34 will have a 1 output which will be fed back as a latch to insure that it continues to have two 1's at its input even after the contactor is opened in response to the command SA. This output of AND gate 34 provides a disabling input to the AND gates 31 and 32 to prevent the end position error output developed in AND gates 28 and 29 from being fed back to the central control transmitter.

The manner in which the circuit distinguishes between short voltage dips and prolonged voltage dips can best be seen with reference to FIG. 2. Shown on the waveform a are two voltage dips one occuring between time $t_1$ and $t_2$ of a short duration and one occuring between times $t_3$ and $t_4$ of a more prolonged duration. As described above, when the voltage $U_m$ drops below the voltage $U_g$ the signal SA appears and through OR gate 3 opens the contacts a1–a5. The signal USI prevents any change in the state of any of the storage flip flops or a feedback of an end position error signal. If the voltage dip is of short duration and ends at $t_2$ the output SA of the comparator 12 returns to a logical 0 before the occurrence of the pulse shown by waveform c which occurs after the delay T13. Thus, the signal USI returns to 0 at the same time. Under these conditions the output of OR gate 3 returns to a logical 0 and AND gate 41 is enabled so that the ON command remaining stored in the flip flop 2 will be transmitted through the amplifier 4 to energize the contactor coils 107 to close the main contactor again. Note, that as long as a signal is provided out of OR gate 3 commanding that contactor be opened the AND gate 41 is disabled through its inverted input from OR gate 3 from permitting an ON command reaching coil 107. Similarly, an output from gate 32 indicating an end position error disables AND gate 41.

If however the voltage dip is of a prolonged duration greater than the time T13 as shown by the time duration between the time $t_3$ and $t_4$ on FIG. 2, the contactor will not be reclosed. At the end of the time T13, the output of the delay circuit 13, A13, will become a logical 1 as illustrated on waveform c) of FIG. 2. This will result in the output USI returning to a logical 0 state while the output SA remains in a logical 1 state. With the output USI returning to 0 the output of OR gate 18 will now pass through AND gate 19 setting the flip flop 1 and causing the coil 105 to be energized through OR gate 3 and amplifier 5 insuring that the contactor remains in an opened condition. The output of AND gate 34, now having a logical 0 at one input will become 0 and gates 31 and 32 will be enabled. Since the contactor was assumed to be originally closed, the flip flop 27 has a $\overline{Q}$ output. What this means is that as soon as the contact a5 was opened AND gate 29 had an output going from 0 to 1. This happened in the first example for the dip of short duration as indicated by the waveform e of FIG. 2. However because of the disabling of gate 32 the signal EFN never reached terminal 38. However, now with a voltage dip of longer duration, as soon as the output of AND gate 34 changes and AND gate 31 and 32 are enabled, this signal EFEN appears at the terminal 38 as illustrated by the waveform S of FIG. 2. It is fed back to the central control transmitter and further changes are prevented from taking place until appropriate action is taken. Note that the output of gate 29 is an input to OR gate 30 so that even when the signal USI disappears this gates still has an output disabling gates 21 and 22 and preventing any change in the state of flip flop 27.

In comparison to prior art circuits which only develop a protective command such as the command SA which would then open the contactor and permanently shut down the system, the inclusion of the additional circuits herein permits reclosing the contactor in the case of a voltage dip of short duration. The priority circuit 115 insures that only if the contactor was ON before the voltage dip will it again be switched ON. Note that the output of the priority circuit from AND gate 34 to the disabling input to the AND gate 31 and 32 only if the contactor was initially closed. What this means is that if at any time even during the voltage dip the contactor for some reason closes, an end position error signal will be generated and fed back to the central command transmitter.

Thus, an improved drive circuit for a main contactor which permits reclosing the contactor after voltage dips of short durations but of maintaining the contactor opened should a prolonged voltage dip occur has been shown. Although a specific embodiment has been illustrated and described, it will be obvious to those skilled in the art that various modifications may be made without departing from the spirit of the invention which is intended to be limited solely by the appended claims.

What is claimed is:

1. In a drive circuit for a main contactor of the type which converts control commands from a command control transmitter into positioning commands for coupling contactors which switch the main contactors ON and OFF and which includes an end position error monitor forming end position error signals by comparing positioning command stored in command storage units with return signals from signalling contacts of the main contactor the improvement comprising:
   a. means for monitoring an undervoltage of the control voltage of the main contactor and providing a protection command output which is coupled to switch off the main contactor if the voltage falls below a specified limit;
   b. means for forming an undervoltage pulse output which begins with the occurence of the protection command and has a length which is the shorter of the length of the protection command and a predetermined maximum duration;
   c. first blocking gates coupling the end position error signals to the command control transmitter, said gates having said undervoltage pulse output as disabling inputs; and
   d. second blocking gates coupling the command storage units to inputs from the command control transmitter and having as disabling inputs said undervoltage pulse output.

2. A drive circuit according to claim 1 wherein said means for forming said undervoltage pulse comprise:
   a. delay means having as an input the protective command output of said means for monitoring and having a response delay corresponding to said predetermined maximum duration; and
   b. a gate having as inputs said protection command output and the output of said delay means.

3. A drive circuit according to claim 1 and further including priority circuit means arranged to couple said undervolvoltage pulse output to disable said end position error signal blocking gates only if said main contactor was closed at the beginning of said protection command.

4. A drive circuit according to claim 3 wherein said priority circuit comprises:
   a. an OR gate having as an input a return signal from a signalling contact associated with said main contactor; and
   b. an AND gate having as a first input the output of said OR gate and a second input said undervoltage pulse, the output of said AND gate being provided as a second input to said OR gate.

5. A drive circuit according to claim 4 wherein said means for forming said undervoltage pulse comprise:
   a. delay means having as an input the protective command output of said means for monitoring and having a response delay corresponding to said predetermined maximum duration; and
   b. a gate having as inputs said protection command output and the output of said delay means.

* * * * *